United States Patent
Takatani (10) Patent No.: US 9,361,472 B2
(45) Date of Patent: Jun. 7, 2016

(54) INFORMATION PROCESSING APPARATUS, CONTROL METHOD OF INFORMATION PROCESSING APPARATUS, AND PROGRAM

(75) Inventor: Tamotsu Takatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 443 days.

(21) Appl. No.: 13/238,610

(22) Filed: Sep. 21, 2011

(65) Prior Publication Data
US 2012/0079284 A1 Mar. 29, 2012

(30) Foreign Application Priority Data
Sep. 28, 2010 (JP) ................................ 2010-217272

(51) Int. Cl.
*G06F 21/62* (2013.01)
*G06F 21/80* (2013.01)
*G06F 11/14* (2006.01)
*G06F 21/78* (2013.01)
*G06F 21/81* (2013.01)
(Continued)

(52) U.S. Cl.
CPC ........ *G06F 21/6218* (2013.01); *G06F 11/1456* (2013.01); *G06F 11/1458* (2013.01); *G06F 11/1469* (2013.01); *G06F 21/78* (2013.01); *G06F 21/80* (2013.01); *G06F 21/81* (2013.01); *G06F 21/85* (2013.01); *H04N 1/4486* (2013.01); *G06F 2221/2107* (2013.01); *H04N 1/00347* (2013.01); *H04N 2201/0087* (2013.01); *H04N 2201/0094* (2013.01)

(58) Field of Classification Search
CPC ..... G06F 21/6218; G06F 21/78; G06F 21/81; G06F 21/85; G06F 21/80; G06F 2221/2107; G06F 11/1469; G06F 11/1456; G06F 11/1458; H04N 1/4486; H04N 1/00347; H04N 2201/0094; H04N 2201/0087
USPC .................... 713/168, 189, 193; 380/270, 277
See application file for complete search history.

(56) References Cited

U.S. PATENT DOCUMENTS

| 7,765,341 | B2 * | 7/2010 | Corbett et al. .................. 710/36 |
| 2002/0176580 | A1 * | 11/2002 | Horiuchi et al. ............... 380/270 |

(Continued)

FOREIGN PATENT DOCUMENTS

| CN | 101647006 A | 2/2010 |
| JP | 2005-149025 A | 6/2005 |

OTHER PUBLICATIONS

Nicholson, Anthony J., Mark D. Corner, and Brian D. Noble. "Mobile device security using transient authentication." Mobile Computing, IEEE Transactions on 5.11 (2006): 1489-1502.*

(Continued)

*Primary Examiner* — Kari Schmidt
(74) *Attorney, Agent, or Firm* — Canon U.S.A., Inc. IP Division (57) ABSTRACT

An information processing apparatus includes a decryption processing unit, a backup unit, and a control unit. The decryption processing unit is configured to decrypt encrypted data read from a first storage unit storing the encrypted data. The backup unit is configured to back up the encrypted data stored in the first storage unit to a second storage unit. When the backup unit backs up the encrypted data stored in the first storage unit to a second storage unit, the control unit is configured to control the decryption processing unit to store the encrypted data read from the first storage unit, in the second storage unit without performing decrypting processing.

3 Claims, 7 Drawing Sheets

(51) Int. Cl.
*G06F 21/85* (2013.01)
*H04N 1/44* (2006.01)
*H04N 1/00* (2006.01)

(56) References Cited

U.S. PATENT DOCUMENTS

| | | |
|---|---|---|
| 2003/0120942 A1* | 6/2003 | Yoshida et al. ............... 713/193 |
| 2005/0283662 A1 | 12/2005 | Li |
| 2006/0101285 A1* | 5/2006 | Chen et al. ................... 713/193 |
| 2007/0022290 A1* | 1/2007 | Itoh ............................... 713/168 |
| 2007/0033320 A1* | 2/2007 | Wu et al. ....................... 711/100 |
| 2007/0055894 A1 | 3/2007 | Osaki |
| 2007/0204171 A1* | 8/2007 | Ito et al. ........................ 713/193 |
| 2007/0280475 A1 | 12/2007 | Dellow |
| 2008/0016307 A1* | 1/2008 | Takano et al. ................. 711/164 |
| 2008/0126813 A1* | 5/2008 | Kawakami .................... 713/193 |
| 2008/0226081 A1* | 9/2008 | Terao ............................ 380/277 |
| 2008/0307020 A1* | 12/2008 | Ko et al. ........................ 707/204 |
| 2010/0031058 A1* | 2/2010 | Kito et al. ..................... 713/193 |
| 2011/0060921 A1* | 3/2011 | Michael ........................ 713/192 |
| 2012/0246472 A1* | 9/2012 | Berengoltz et al. ........... 713/165 |

OTHER PUBLICATIONS

Diesburg, Sarah M., et al. "When cryptography meets storage." Proceedings of the 4th ACM international workshop on Storage security and survivability. ACM, 2008. (pp. 11-20).*

* cited by examiner

INFORMATION PROCESSING APPARATUS, CONTROL METHOD OF INFORMATION PROCESSING APPARATUS, AND PROGRAM

BACKGROUND OF THE INVENTION

1. Field of the Invention

The present invention relates to an information processing apparatus including a storage device, a control method of the information storage apparatus, and a program.

2. Description of the Related Art

In an image forming apparatus, a storage function, which includes a mass-storage device such as a hard disk drive (HDD) and stores image data scanned by a scanner unit, has been realized. Further, a function capable of storing data other than the scanned image data, received from a personal computer terminal in the above HDD has been also realized, so that the image forming apparatus very often functions as a storage.

Further, since important data is stored in a mass-storage device, it is necessary to secure safety of these data. Thus, for example, Japanese Patent Application Laid-Open No. 2005-149025 discusses a technique to realize a function to perform encryption of data by attaching an encryption board to a mass-storage device in an image forming apparatus.

Figure 6A:
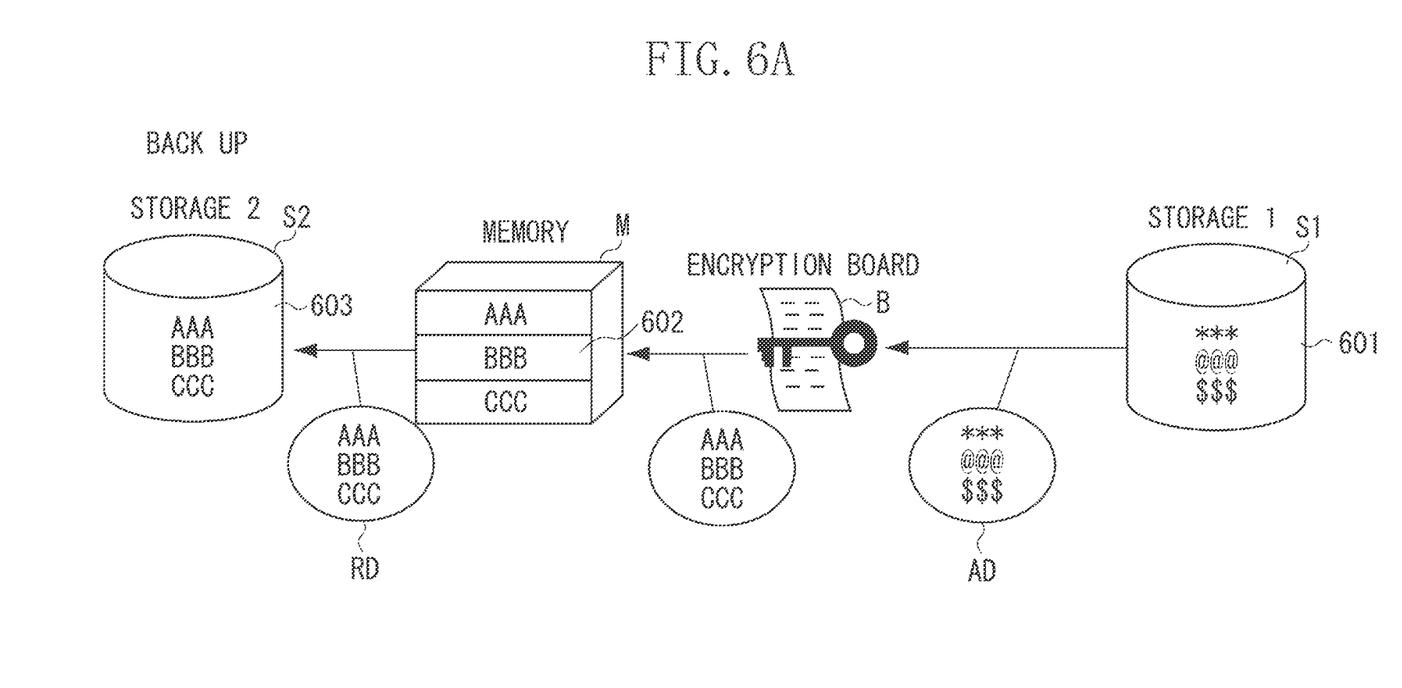
FIGS. 6A and 6B illustrate data processing examples performed by a plurality of storage devices.
Figure 6B:
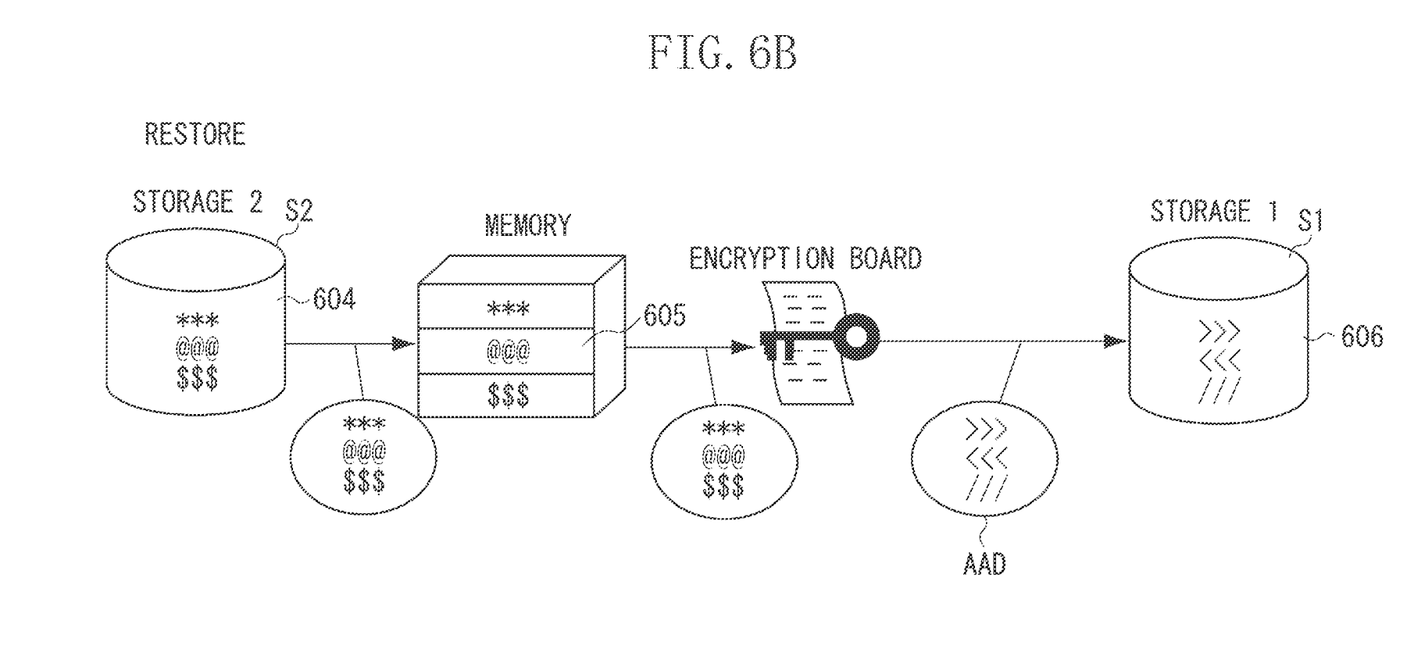

In the aforementioned image forming apparatus, when encrypted data stored in an mass-storage device is backed up to another storage by using the encryption board, there have been a problem illustrated in FIG. 6.

FIG. 6 illustrates conventional backup processing and restoring processing of data. FIG. 6A corresponds to the backup processing and FIG. 6B corresponds to the restoring processing.

In FIG. 6A, a storage S1 is an HDD and a storage S2 is a semiconductor storage device, for example, a flash disk or an external storage connected to a universal serial bus (USB) controller 108 as a destination. The storage S2 is a storage for backing up data stored in the storage S1.

The storage S1 stores encrypted data AD and backs it up to the storage S2 as illustrated in FIG. 6A. The stored encrypted data AD is read into a memory M. Since the encrypted data AD backed up in the memory M has passed through an encryption board B, the data is decrypted and becomes plain text data RD. Thus, when the encrypted data AD read into the memory M is written in the storage S2, the plain text data RD is backed up to the storage S2. In other words, the encrypted data AD stored in the storage S1 is backed up to the storage S2 as the plain text data. Therefore, it becomes difficult to retain security of the backed up data.

Further, in FIG. 6B, there is the encrypted data AD in the storage S2 and the data is restored to the storage S1.

In this case, the encrypted data AD is read from the storage S2 into the memory M. There is the encrypted data AD on the memory M and the data AD is written in the storage S1. Since the encrypted data AD read into the memory M passes through an encryption board B, the data AD is further encrypted and restored to the storage S1 as doubly encrypted data AAD.

To deal with such a situation, an encryption board can be attached to the other storage. However, two encryption boards are used in this case, so that a production cost increases. Further, it is not realistic to doubly manage keys used in encryption/decryption.

SUMMARY OF THE INVENTION

The present invention provides a system capable of normally backing up encrypted data without lowering a security level, even when the encrypted data is stored in a storage device. Further, the present invention provides, when the backed-up encrypted data is restored, a system for preventing double encryption of the data in the restoring, so that the encrypted data can be normally restored.

According to an aspect of the present invention, an information processing apparatus includes a decryption processing unit, a backup unit, and a control unit. The decryption processing unit is configured to decrypt encrypted data read from a first storage unit storing encrypted data. The backup unit is configured to back up encrypted data stored in the first storage unit to a second storage unit. When the backup unit backs up encrypted data stored in the first storage unit to the second storage unit, the control unit is configured to control the decryption processing unit to store encrypted data read from the first storage unit, in the second storage unit without performing decryption.

Further, according to another aspect of the present invention, the information processing apparatus includes an encryption/decryption processing unit, a restoring unit, and a control unit. The encryption/decryption processing unit is configured to encrypt data to be written in the first storage unit and decrypts encrypted data read from the first storage unit. The restoring unit is configured to restore encrypted data stored in the second storage unit to the first storage unit. When the restoring unit restores encrypted data in the second storage unit to the first storage unit, the control unit is configured to control to further encrypt encrypted data read from the second storage processing unit and store in the first storage unit by using the encryption/decryption processing unit, and control the encryption/decryption processing unit to doubly decrypt the doubly encrypted data read from the first storage unit, encrypt the doubly decrypted data, and write the encrypted data in the first storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
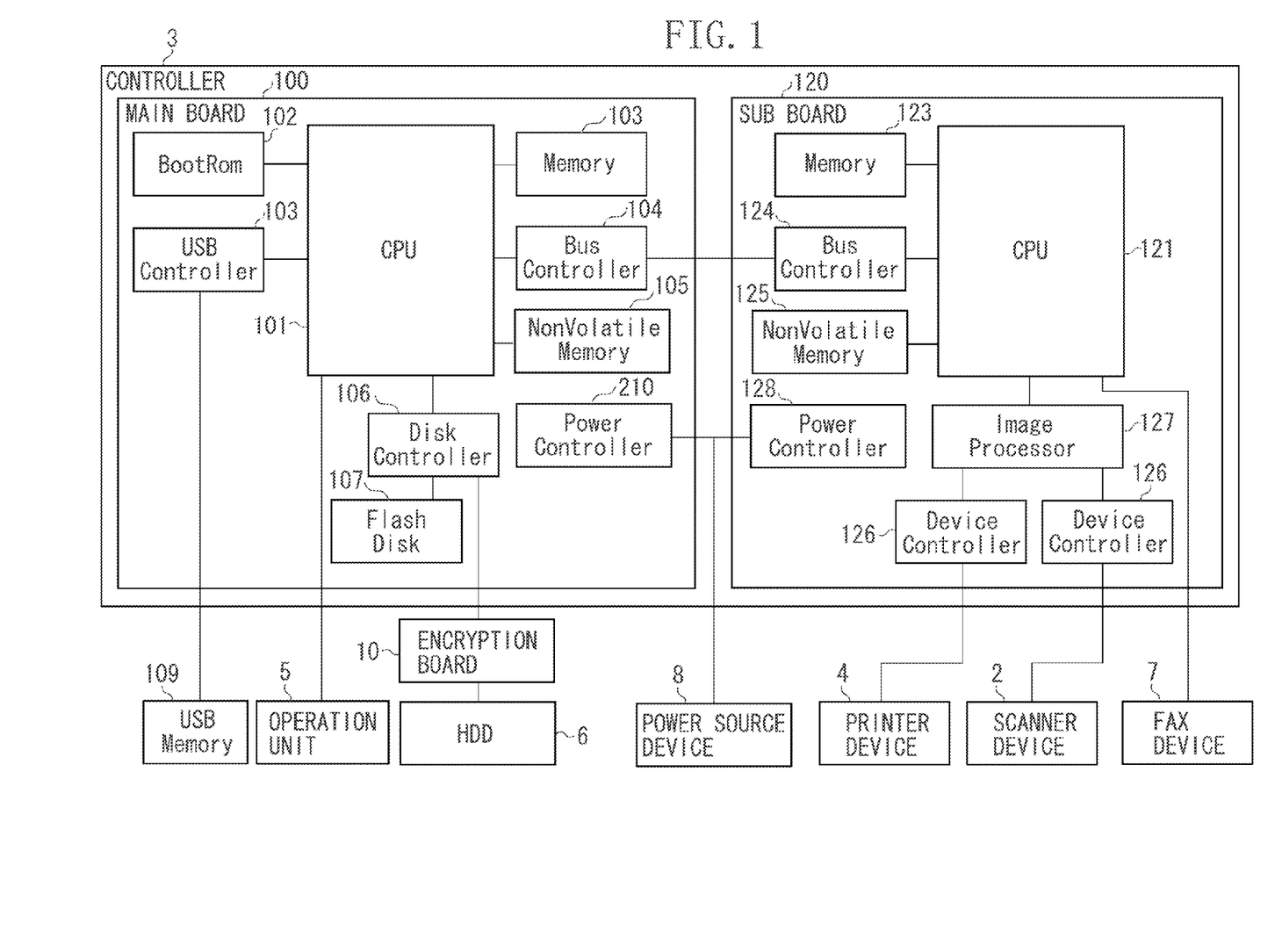
FIG. 1 is a block diagram illustrating an example of an information processing apparatus according to the present invention.

FIG. 1 is a block diagram illustrating an example of an information processing apparatus according to a first exemplary embodiment. In this exemplary embodiment, an image forming apparatus configured of a multi faction peripheral will be described, as an example of an information processing apparatus. However, the present invention is not limited to the image forming apparatus as long as the apparatus includes a system which performs backup processing and restoring processing of data stored in one storage device by using a plurality of storage devices. In this exemplary embodiment, a first storage device is a hard disk and a second storage device is configured of a USB memory or a flash disk (SSD), which are described later, will be described. However, the first storage device and the second storage device are not limited to the above description.

In FIG. 1, a controller 3 includes a main board 100 and a sub board 120. The main board 100 includes a central processing unit (CPU) 101, a boot ROM 102, a memory 103, a bus controller 104, and a nonvolatile memory 105. The CPU 101 controls the entirety board. The boot ROM 102 includes a boot program. The CPU 101 uses the memory 103 as a work memory. The bus controller 104 has a bridge function with an external bus. The non volatile memory 105 is a memory in which data does not disappear even when a power source is shut down.

Further, the main board 100 includes a disk controller 106, which controls a storage device. The disk controller 106 connects to a flash disk (SSD) 107 which is configured of a semiconductor device and is a relatively small capacity storage device. The disk controller 106 further connects to a hard disk device (HDD) 6 via an encryption board 10. Further, the main board 100 includes a USB controller 108 and connects to a USB memory 109.

At an external of the main board 100, the USB memory 109, an operation unit 5, the HDD 6, and the encryption board 10 are connected. The encryption board 10 functions as an encryption/decryption processing unit and is connectable to the HDD 6.

When the CPU 101 requests the disk controller 106 to read data from the HDD 6, encrypted data is read from the HDD 6, decrypted at the encryption board 10, and stored in the memory 103 via the disk controller 106 and the CPU 101. On the other hand, when the CPU 101 requests the disk controller 106 to write data to the HDD 6, plain text data is encrypted at the encryption board 10 and written in the HDD 6. Thus, an operation mode in which the encryption board 10 decrypts data read from the HDD 6 or encrypts data to be written in the HDD 6 is referred to as a normal mode.

On the other hand, the encryption board 10 can also transfer encrypted data to the disk controller 106 as it is, without decrypting the encrypted data read from the HDD 6. A mode performing such an operation is referred to as a through mode. A case where the encryption board 10 operates in the through mode will be described in detail below.

Further, the encryption board 10 can read data once written in the HDD 6 from the HDD 6, decrypt the read data twice, write the decrypted data in the memory 103, encrypt again the data written in the memory 103, and write the encrypted data in the HDD 6. An operation mode in which the encryption board 10 performs decryption processing twice is referred to as a double decryption mode. A case where the encryption board 10 operates in the double decryption mode will be described in detail below.

A sub board 120 is configured of a CPU system and image processing hardware. The sub board 120 includes a CPU 121, a memory 123, a bus controller 24, and a nonvolatile memory 125. The CPU 121 controls the entire sub board. The CPU 121 uses the memory 123 as a work memory. The bus controller 124 has a bridge function with an external bus. The nonvolatile memory 125 is a memory in which data is not disappeared when a power source is shut down.

Further, sub board 120 includes an image processor 127 for performing real time digital image processing and a device controller 126.

A scanner apparatus 2 and a printer apparatus 4 transfer digital image data via the device controller 126. The CPU 121 directly controls a facsimile apparatus 7.

In addition, power source of the main board 100 and the sub board 120 is supplied from a power source device 8. Power controllers 210 and 128 supply electric power to each unit on the main board 100 and sub board 120 which need electric power.

In the present exemplary embodiment, the CPU 101 and the CPU 121 include many peripheral hardware, such as a chip set, a bus bridge, and a clock generator. Although those are omitted because their description is not necessary, this block configuration does not limit the present invention.

Then, an operation of the controller 3 will be described referring to an example of image copying.

When a user instructs image copying from the operation unit 5, the CPU 101 transmits an image reading command to the scanner apparatus 2 via CPU 121. When the scanner apparatus 2 receives the command, the scanner apparatus 2 optically scans a sheet document and converts it to digital image data. The scanner apparatus 2 inputs digital image data to the image processor 127 via the device controller 126.

The image processor 127 performs direct memory access (DMA) transfer to the memory 123 via the CPU 121 and temporarily stores the digital image data in the memory 123.

When the CPU 101 confirms that a predetermined amount or the entire digital image data is input in the memory 123, the CPU 101 outputs an image output instruction to the printer apparatus 4 via the CPU 121. The CPU 121 notifies a position of the image data in the memory 123 to the image processor 127. According to a synchronized signal from the printer apparatus 4, the image data on the memory 123 is transmitted to the printer apparatus 4 via the image processor 127 and the device controller 126 and then, the digital image data is printed on a paper sheet in the printer apparatus 4.

When the image forming apparatus performs a plurality of printings, the CPU 101 stores the image data saved in the memory 123, in the HDD 6, and can transmit the digital image data to the printer apparatus 4 without receiving the digital image data from the scanner apparatus 2 concerning the second copy or subsequent ones. In this case, the image data stored in the HDD 6 is encrypted by the encryption board 10.

Figure 2A:
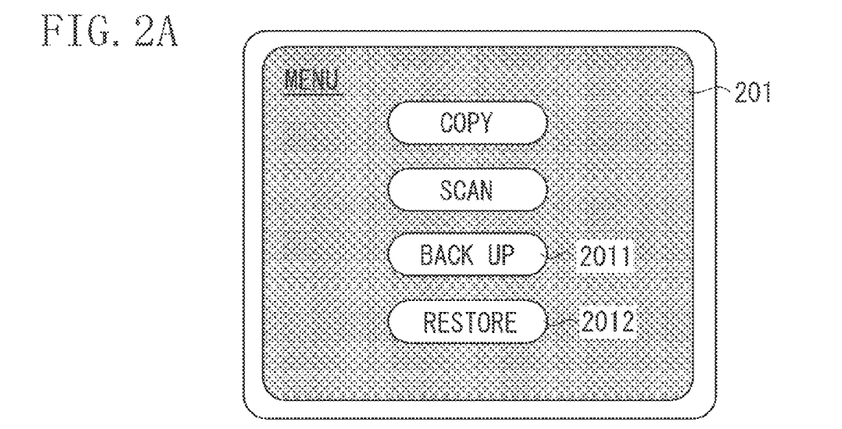
FIGS. 2A, 2B and 2C illustrates an example of a user interface (UI) screen displayed on an operation unit.
Figure 2B:
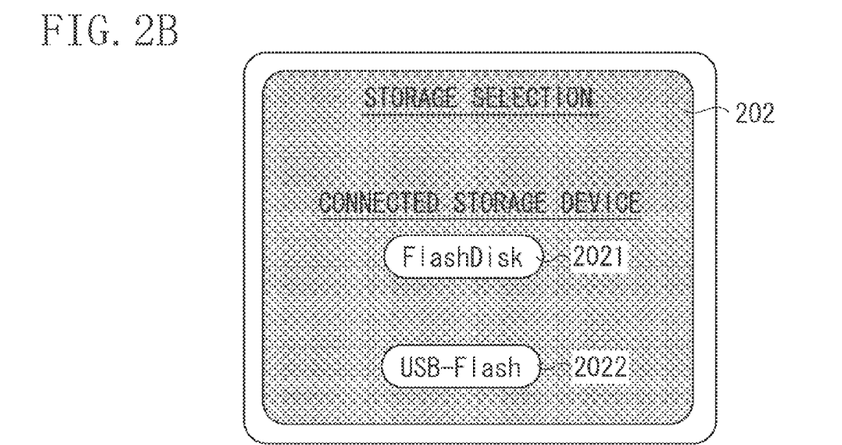
Figure 2C:
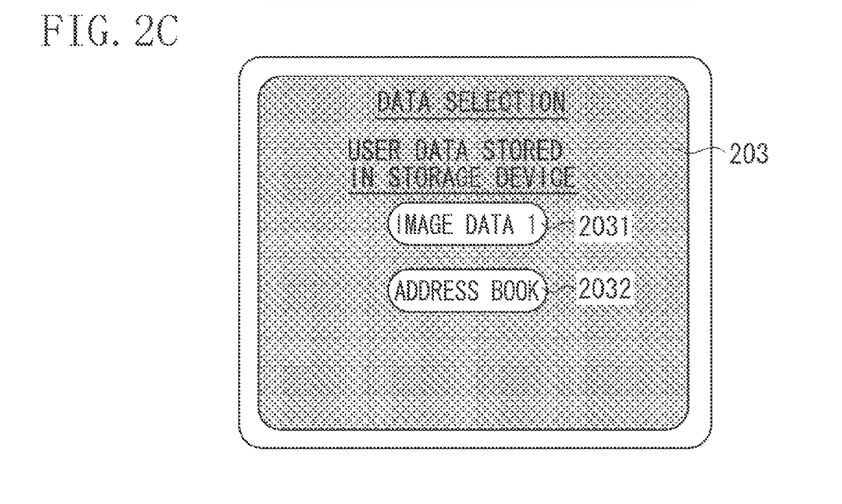

FIG. 2 illustrates an example of an operation screen (user interface: UI) displayed on the operation unit 5 illustrated in FIG. 1.

In FIG. 2, a screen 201 is a menu screen displayed at the highest hierarchy and has a function calling each function of the image forming apparatus.

A button 2011 is a button for instructing backup of data stored in the HDD 6. When a user selects the button 2011, the screen is transferred to a screen 202. A button 2012 is a button for executing restoring. The screen 202 is a screen for displaying and selecting from a list of storage devices connected to the image forming apparatus.

For example, when a flash disk 107 and a USB memory 109 are connected to the image forming apparatus, these storage devices are displayed as the buttons 2021 and 2022. By selecting either the button 2021 or the button 2022, a user can select a storage which is a backup destination.

A screen 203 is a screen for displaying and selecting back up or restore target data. The screen 203 displays user data stored in the HDD 6, the flash disk 107, or the USB memory 109 in the image forming apparatus.

For example, a button 2031 for selecting image data 1 and a button 2032 for selecting an address book are displayed on the screen 203. A user can select data to be backed up or restored by selecting the button 2032 on the screen 203.

Figure 3:
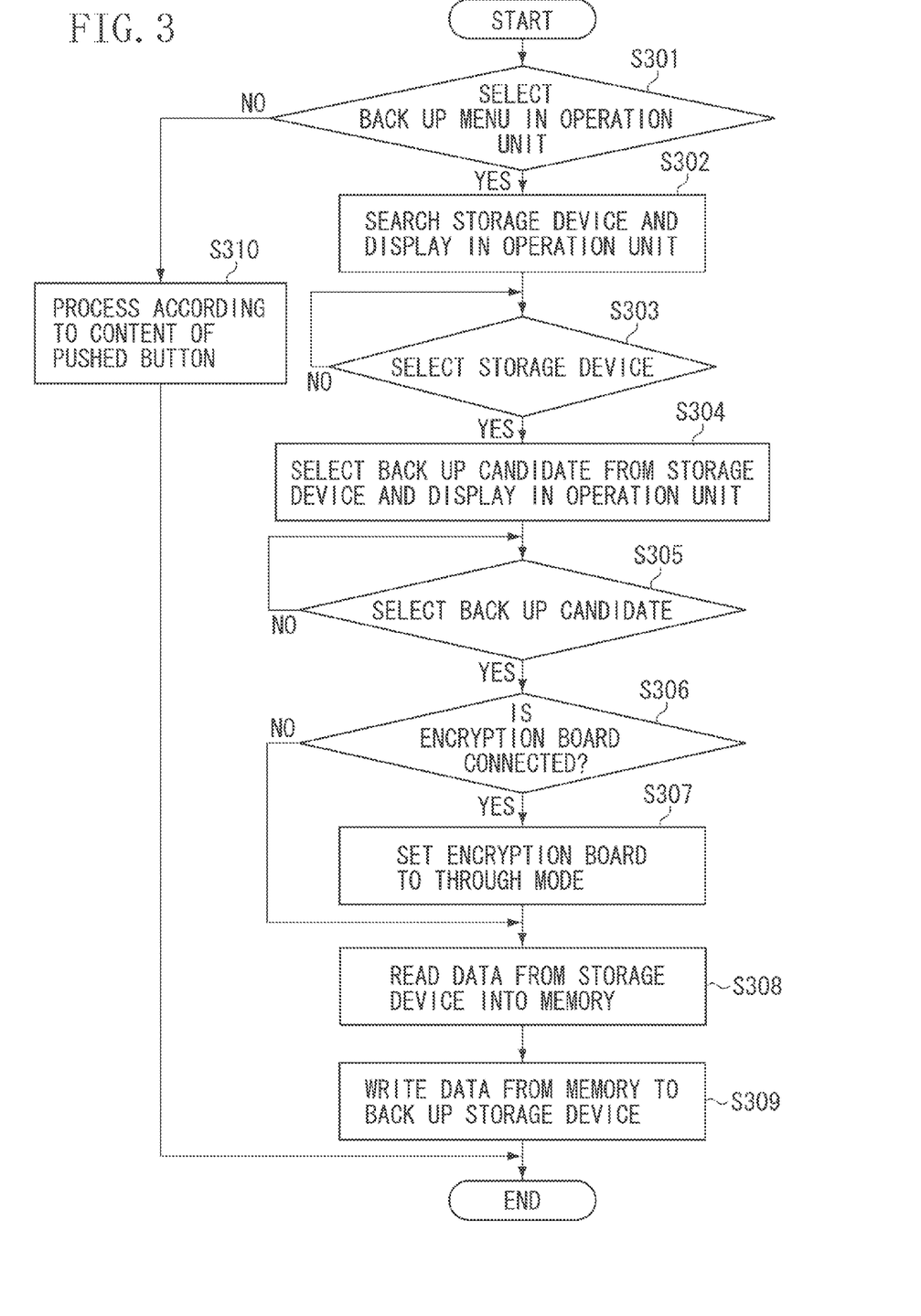
FIG. 3 is a flow chart illustrating data processing steps of the information processing apparatus.

FIG. 3 is a flowchart illustrating data processing steps of the image forming apparatus in the present exemplary embodiment. As an example, the backup processing 1 is performed in the image forming apparatus illustrated in FIG. 1. The CPU 101 realizes each step by loading a control program from the HDD 6 to the memory 103 to execute them.

In step S301, the CPU 101 determines a kind of the button selected by a user in a backup menu displayed on the operation unit 5 as illustrated in FIG. 2A. When the CPU 101 determines that the user has selected the button 2011 for back up (YES in step S301), the processing proceeds to step S302. When the CPU 101 determines that the user pushes a button other than the button 2011 (NO in step S301), the processing proceeds to step S310, and the CPU 101 executes processing corresponding to a content of the pushed button and ends the present flowchart.

In step S302, the CPU 101 searches a storage device for back up, which is connected to the image forming apparatus, and displays the storage selection screen 202 on the operation unit 5 as illustrated in FIG. 2B. The storage selection screen 202 contains the button for selecting the searched storage device. The CPU 101 searches storages devices connected to the image forming apparatus at a time of transit from step S301 to step S302.

In this searching operation, the CPU 101 detects, for example, the flash disk 107 mounted inside the main board 100 and the USB memory 109 connected via the USB controller 108. Therefore, in the present exemplary embodiment, the button 2021 and the button 2022 are displayed on the operation unit 5. The button 2021 selects the flash disk 107 and the button 2022 selects the USB memory 109 as a selected storage device.

In step S303, the CPU 101 determines whether the user has selected either the flash disk 107 or the USB memory 109 as a storage device for back up, on the storage selection screen illustrated in FIG. 2B. More specifically, the CPU 101 determines whether the user has selected the button 2021 or the button 2022 on the storage selection screen illustrated in FIG. 2B.

The user selects, on the storage selection screen illustrated in FIG. 2B, either the flash disk 107 or the USB memory 109 as a storage device for back up. The CPU 101 stores information according to the storage device corresponding to the selected button in the memory 103.

In step S304, the CPU 101 searches data in the HDD 6 and displays the button 2031 and the button 2032 on the operation unit 5 as illustrated in FIG. 2C. The button 2031 and the button 2032 are buttons for selecting data of backup candidates. The backup candidate is image data and an address book which are stored in the HDD 6. In addition, CPU 101 displays the button 2031 and the button 2032 on the operation unit 5 in association with information indicating the backup candidates. The associated information is a directory name and a file name of the information stored in the HDD 6.

In step S305, the CPU 101 determines whether the user has selected the button 2031 or the button 2032 as a button for instructing the backup candidate. In the present exemplary embodiment, as illustrated in FIG. 2C, the image data 1 and the address book are displayed on the operation unit 5 as data of the backup candidate. When the CPU 101 determines that the user has selected one of buttons (YES in step 305), the CPU 101 stores information corresponding to the selected button in the memory 103, and the processing proceeds to step S306. In addition, the user may not select the data of the backup candidate. In such a case, the entire data stored in the HDD 6 becomes an object to be backed up.

In step S306, the CPU 101 determines whether the encryption board 10 is connected to the image forming apparatus. When the CPU 101 determines that the encryption board 10 is connected to the image forming apparatus (YES in step S306), the processing proceeds to step S307. When the CPU 101 determines that the encryption board 10 is not connected to the image forming apparatus (NO in step S306), the processing proceeds to step S308.

In step S307, the CPU 101 sets the through mode to the encryption board 10 as a mode for reading data from the HDD 6. More specifically, when the CPU 101 reads data encrypted and stored in the HDD 6, the CPU 101 sets to the encryption board 10, a mode which reads the encrypted data into the memory 103 without decryption.

In step S308, the CPU 101 reads target data (the image data 1 or the address book) from the HDD 6 into the memory 103, based on the button selected by the user as the backup target in step S305.

At this time, since the CPU 101 sets the through mode to the encryption board 10 in step S307, the encrypted data stored in the HDD 6 is read into the memory 103 in an encrypted state.

In step S309, the CPU 101 writes the data into the memory 103 in step S308, to the storage device (the flash disk 107 or the USB memory 109) selected in step S303.

Accordingly, in the first exemplary embodiment, when the CPU 101 determines that the encryption board 10 is connected to the image forming apparatus in step S306, the CPU 101 writes data in an encrypted state to a storage device which is a backup target, since the data in the encrypted state is stored in the memory 103 in step S308. In other words, the data which is selected as a backup target and read from HDD 6 into the memory 103, and the data which is written from the memory 103 to the HDD 6, are in an encrypted state at a time of backup processing. These data are encrypted and stored in the HDD 6. Therefore, security of the backed up data can be retained.

Figure 4:
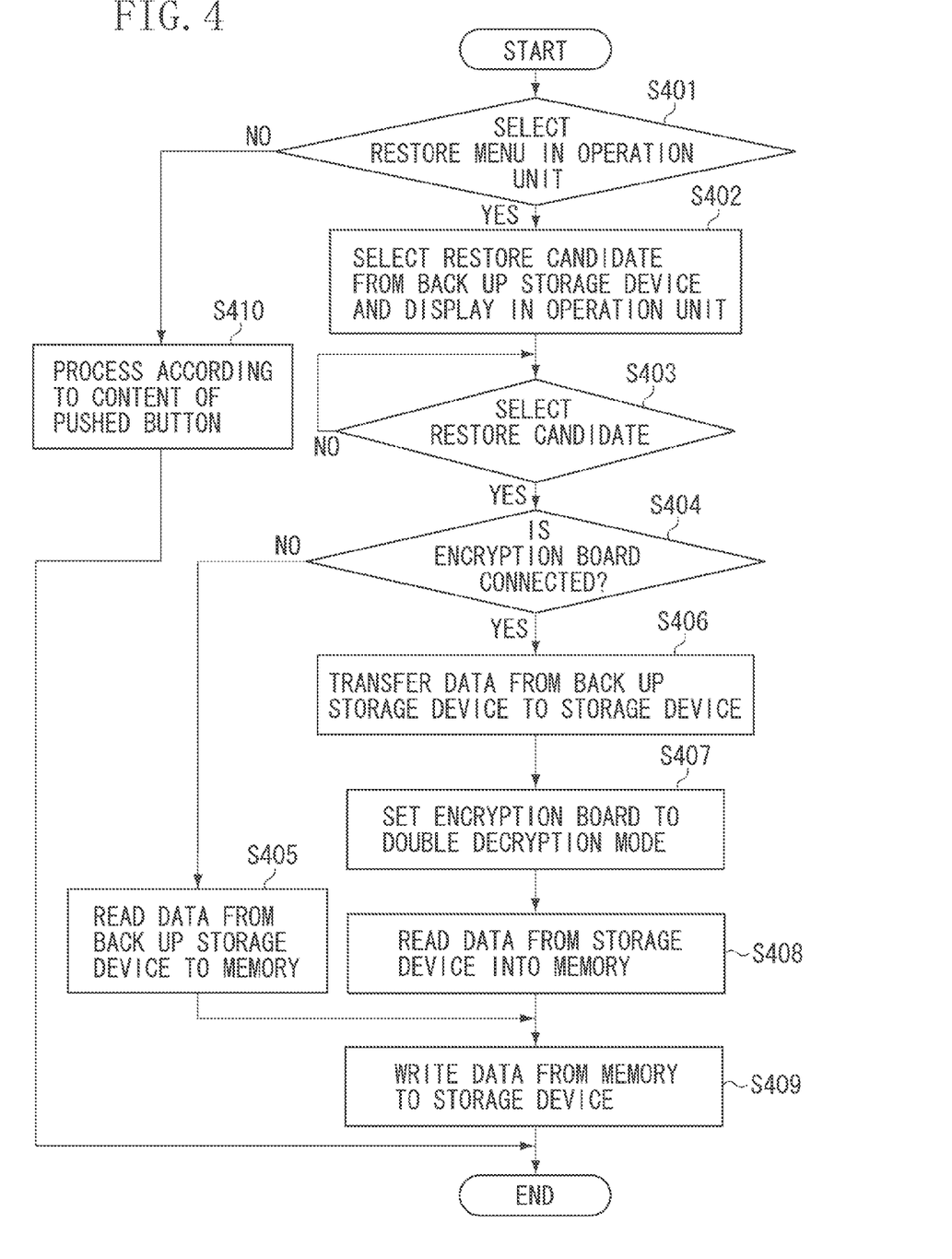
FIG. 4 is a flow chart illustrating data processing steps of the information processing apparatus.

FIG. 4 is a flowchart illustrating data processing steps of the information processing apparatus according to the first exemplary embodiment. In this case, as an example, a restoring processing is executed in the image forming apparatus illustrated in FIG. 1. The CPU 101 realizes each step by loading a control program from HDD 6 to the memory 103 to execute it.

In step S401, the CPU 101 determines whether a user has selected the button 2012 for restoring from the buttons displayed on the operation unit 5, in the menu screen illustrated in FIG. 2. When the CPU 101 determines that the user has selected the button 2012 for restoring (YES in step S401), the processing proceeds to step S402. When the user pushes a button other than the button 2012 (NO in step S401), the processing proceeds to step S410 and the CPU 101 executes processing corresponding to the pushed button and ends the present flowchart.

In step S402, the CPU 101 searches a storage device other than the HDD 6 connected to the image forming apparatus. When there is backed up data in the searched storage device, the CPU 101 displays information of the data on the operation unit 5 as the storage selection screen illustrated in FIG. 2B. The storage device other than the HDD 6 is, for example, the flash disk 107 mounted inside the main board 100 or the USB memory 109 connected to the CPU 101 via the USB controller 108.

In step S403, the CPU 101 determines whether the user has selected a restoring candidate in the data backed up in the flash disk 107 and the USB memory 109 which are displayed on the operation unit 5. When the CPU 101 determines that the user has selected the data which becomes the restoring candidate, on the operation unit 5 (YES in step S403), the CPU 101 stores information of the data selected by the user in the memory 103 and the processing proceeds to step S404.

In step S404, the CPU 101 determines whether the encryption board 10 is connected to the image forming apparatus. When the CPU 101 determines that the encryption board 10 is connected to the image forming apparatus (YES in step S404), the processing proceeds to step S406. When the CPU 101 determines that the encryption board 10 is not connected to the image forming apparatus (NO in step S404), the processing proceeds to step S405.

In step S405, the CPU 101 reads, based on the data selected in step S403, data from a storage device, which is connected for backing up (for example, the USB memory 109), into the memory 103. In step S406, the CPU 101 transfers the data from the storage device for back up to the HDD 6. At this time, the read data passes through the encryption board 10, so that the data is encrypted. More specifically, when the data stored in the storage device for back up is encrypted, the data becomes a double encryption state. In other words, when the CPU 101 executes step S406, in a case where the encryption board 10 is connected to the HDD 6, the encrypted data read from the USB memory 109 is in a state furthermore encrypted by the encryption board 10 and is stored in the HDD 6.

In step S407, the CPU 101 sets the double decryption mode, which doubly decrypts data (decrypts twice), to the encryption board 10. More specifically, when the CPU 101 executes step S407, the CPU 101 sets the double decryption mode to the encryption board 10. In the double decryption mode, the CPU 101 doubly decrypts the doubly encrypted data read from the HDD 6 by using the encryption board 10 and reads the doubly decrypted data to the memory 103.

In step S408, the CPU 101 read the data, which is transferred to the HDD 6 in step S406 and in the doubly encrypted state, to the memory 103. At this time, since the encryption board 10 doubly decrypts the data read from the HDD 6, the doubly encrypted data is in a plain text state.

Then, in step S409, the CPU 101 writes the plain text data read to the memory 103, in HDD 6 and ends the restoring processing. More specifically, when the CPU 101 executes step S409, the data stored in the memory 103 is encrypted by the encryption board 10 and stored in the HDD 6. In other words, in step S409, the encryption board 10 operates in a normal mode.

According to the above processing, data backed up in an encrypted state can be rightly restored. In addition, the CPU 101 can rightly restore the data also by causing the encryption board 10 not to perform encryption processing when the CPU 101 writes data from the backup storage device to the HDD 6. Although the CPU 101 can perform such a method, when a mode which does not perform encryption at a time of writing data to the HDD 6 is provided, plain text data can be stored in the HDD 6 if a setup of the mode is mistaken. Thus, it is not desirable in respect of security. It is more advantageous in respect of security to use the above double decryption mode.

In the above first exemplary embodiment, when the encryption board 10 is connected to the image forming apparatus in step S306 in FIG. 3, the through mode is always set to the encryption board 10. However, the CPU 101 can determine whether to perform encryption on a second storage device used in the backup processing and control the processing. The exemplary embodiment in such a case will be described as follows.

Figure 5:
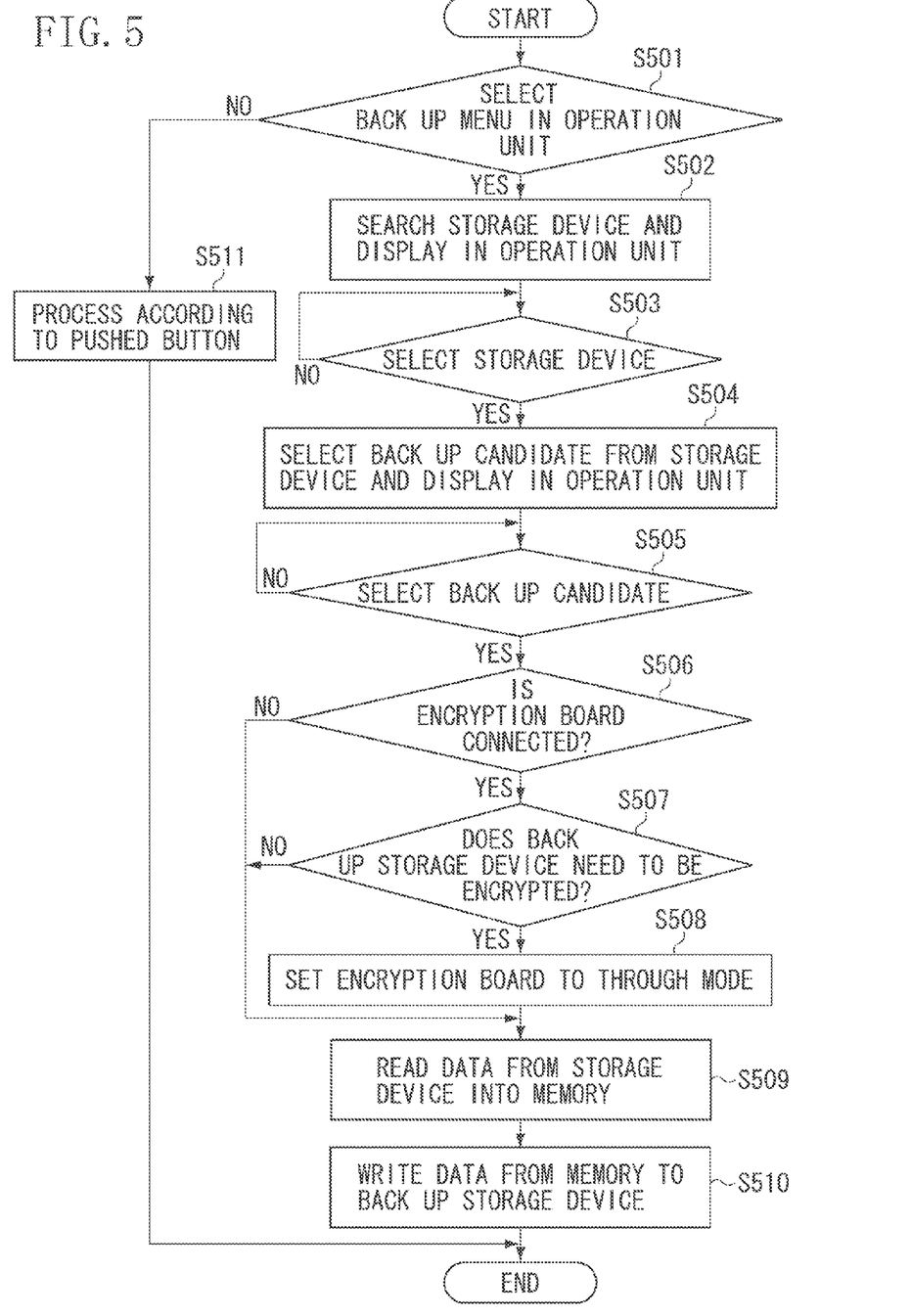
FIG. 5 is a flow chart illustrating data processing steps of the information processing apparatus.

FIG. 5 is a flowchart illustrating data processing steps of the information processing apparatus in a second exemplary embodiment. The second exemplary embodiment is backup processing 2 in a case where a storage device of a backup destination has an encryption function and it is not necessary to draw out data in an encrypted state. The CPU 101 realizes each step by loading a control program from the HDD 6 to the memory 103 to execute it.

In step S501, the CPU 101 determines whether a user has selected the button 2011 in the backup menu displayed on the operation unit 5. When the CPU 101 determines that the user selects the button 2011 for back up (YES in step S501), the processing proceeds to step S502. When the CPU 101 determines that the user has pushed a button other than the button 2011 (NO in step S501), the processing proceeds to step S511, and the CPU 101 executes processing corresponding to the pushed button and ends the present flowchart.

In step S502, the CPU 101 searches a storage device for back up connected to the image forming apparatus and displays buttons for selecting the searched storage device on the operation unit 5 as illustrated in FIG. 2B. For example, when the flash disk 107 mounted inside the main board 100 or the USB memory 109 connected to the CPU 101 via the USB controller 108 is searched, the CPU 101 displays, on the operation unit 5, the button 2021 or the button 2022 as buttons for selecting the corresponding storage device.

In step S503, the CPU 101 determines whether the user has selected the storage device for back up by the buttons displayed on the operation unit 5. The user selects either the button 2021 or the button 2022 representing the storage device of the backup destination displayed on the operation unit 5. When the user selects either the button 2021 or the button 2022, the CPU 101 stores information of the storage device corresponding to the selected button in the memory 103.

In step S504, the CPU 101 searches data in the HDD 6 and displays buttons 2031 and 2032 for selecting data of the backup candidate on the operation unit 5. In this case, the backup candidate is the image data 1 or the address book. Information displayed on the operation unit 5 is similar to the first exemplary embodiment.

In step S505, the CPU 101 determines whether the user has selected the button displayed on the operation unit 5 as a backup candidate. The user selects data of the backup candidate by pressing the button 2031 or the button 2032 displayed on the operation unit 5. When the CPU determines that the user has selected button 2031 or the button 2031 (YES in step S505), the CPU 101 stores information of the data corresponding to the selected button in the memory 103 and the processing proceeds to step S506.

In step S506, the CPU 101 determines whether the encryption board 10 is connected to the image forming apparatus. When the CPU 101 determines that the encryption board 10 is connected to the image forming apparatus (YES in step S506), the processing proceeds to step S507. When the CPU 101 determines that the encryption board 10 is not connected to the image forming apparatus (NO in step S506), the processing proceeds to step S509.

In step S507, the CPU 101 determines whether the storage device of the backup destination, which is selected in step S503, needs to back up the data in an encrypted state. More specifically, based on information whether the encryption board 10 is also connected to the backup destination side, the CPU 101 determines whether the storage device of the backup destination needs to back up the data in an encrypted state.

When the CPU 101 determines that the storage device of the backup destination needs to back up the data in an encrypted state (YES in step S507), the processing proceeds to step S508. When the CPU 101 determines that the storage device of the backup destination does not need to back up the data in an encrypted state (NO in step S507), the processing proceeds to step S509.

In step S508, the CPU 101 sets the through mode as a reading mode to the encryption board 10. In this case, the through mode is similar to the first exemplary embodiment.

In step S509, the CPU 101 reads the target data from the HDD 6 into the memory 103 based on the data of the backup target, which is stored in the memory 103 in step S505. At this time, since the encryption board 10 is set to the through mode, the encrypted data stored in the HDD 6 is read in an encrypted state.

Then, in step S510, the CPU 101 writes the data, which is read into the memory 103 in step S509, to the storage device selected in step S503 and ends the processing.

In the second exemplary embodiment, if the CPU 101 determines that the encryption board 10 is connected to the image forming apparatus in step S506, the CPU 101 sets the through mode in step S508. As the result, the data read from the HDD 6 is stored in the memory 103 without decryption, so that the data in an encrypted state is written in the storage device of backup target.

According to the second exemplary embodiment, if the CPU 101 executes step S507 and determines that it is necessary to encrypt the data for the second storage device, the CPU 101 sets the through mode to the encryption board 10. On the other hand, if the CPU 101 determines that it is not necessary to encrypt the data for the second storage device, the CPU 101 performs control not to set the through mode to the encryption board 10. With this configuration, the CPU 101 can efficiently perform the backup processing and the restoring processing.

As mentioned above, according to the second exemplary embodiment of the present invention, even when the data handled in applications is different, the CPU 101 can perform a transfer by deleting unnecessary data with a data definition file at a time of installing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-217272 filed Sep. 28, 2010, which is hereby incorporated by reference herein in its entirety.

What is claimed is:

1. An information processing apparatus comprising:
at least one processor;
a memory connected to the at least one processor;
a first storage device, wherein the first storage device is a hard disk drive (HDD);
a second storage device, wherein the second storage device is a flash disk or an external storage connected to an universal serial bus (USB);
a storage controller device configured to connect to the at least one processor;
an encryption/decryption processing device comprising an encryption board configured to encrypt data to be written in the first storage device and decrypt encrypted data read from the first storage device and further wherein the encryption processing device is disposed between the storage controller device and the first storage device;
a restoring unit configured to restore encrypted data stored in the second storage device connected to the information processing apparatus; and
a control unit configured to instruct the restoring unit to restore a first encrypted data stored in the second storage device to the first storage device and control the encryption/decryption processing device and the storage controller device to:
read the first encrypted data from the second storage device, encrypt the first encrypted data by the encryption/decryption processing device and store a double encrypted data in the first storage device;
decrypt the double encrypted data stored in the first storage device twice by the encryption/decryption processing device and read the twice-decrypted data into the memory; and
encrypt the twice-decrypted data in the memory by the encryption/decryption processing device and store a second encrypted data comprising the encrypted the twice-decrypted data in the first storage device.

2. A control method comprising:
restoring encrypted data stored in a second storage device, wherein the second storage device is a flash disk or an external storage connected to an universal serial bus (USB) connected to an information processing apparatus comprising at least one processor, a memory connected to the at least one processor, a first storage device, wherein the first storage device is a hard disk drive (HDD), a storage controller device configured to connect to the at least one processor, and an encryption/decryption processing device comprising an encryption board configured to encrypt data to be written in the first storage device and decrypt encrypted data read from the first storage device and further wherein the encryption processing device is disposed between the storage controller device and the first storage device;
instructing the encryption/decryption processing device connected to the storage controller device to restore a first encrypted data stored in the second storage device to the first storage device to perform the steps of:
reading by the storage controller the first encrypted data from the second storage device;
encrypting the first encrypted data by the encryption/decryption processing device;
storing by the storage controller a double encrypted data in the first storage device;

decrypting the double encrypted data stored in the first storage device twice by the encryption/decryption processing device and reading the twice-decrypted data into the memory connected to the processor, and encrypting the twice-decrypted data in the memory by the encryption/decryption processing device and storing a second encrypted data comprising the encrypted the twice-decrypted data in the first storage device.

3. A non-transitory storage medium storing a computer program having instructions thereon that when executed by at least one processor of an information processing apparatus, instruct the at least one processor to perform a control method comprising:

restoring encrypted data stored in a second storage device, wherein the second storage device is a flash disk or an external storage connected to an universal serial bus (USB) connected to the-information processing apparatus comprising the at least one processor, a memory connected to the at least one processor, a first storage device, wherein the first storage device is a hard disk drive (HDD), a storage controller device configured to connect to the at least one processor, and an encryption/decryption processing device comprising an encryption board configured to encrypt data to be written in the first storage device and decrypt encrypted data read from the first storage device and further wherein the encryption processing device is disposed between the storage controller device and the first storage device;

instructing the encryption/decryption processing device connected to the storage controller device to restore a first encrypted data stored in the second storage device to the first storage device to perform the steps of:

reading by the storage controller the first encrypted data from the second storage devise;

encrypting the first encrypted data by the encryption/decryption processing device;

storing by the storage controller a double encrypted data in the first storage device;

decrypting the double encrypted data stored in the first storage device twice by the encryption/decryption processing device and reading the twice-decrypted data into the memory connected to the processor, and encrypting the twice-decrypted data in the memory by the encryption/decryption processing device and storing a second encrypted data comprising the encrypted the twice-decrypted data in the first storage device.

* * * * *